April 9, 1940.  J. W. GREIG  2,196,578
BATTERY HOUSING
Filed Dec. 24, 1937    3 Sheets-Sheet 1

INVENTOR
James W. Greig.
BY Dike, Calver & Gray
ATTORNEYS.

April 9, 1940.  J. W. GREIG  2,196,578
BATTERY HOUSING
Filed Dec. 24, 1937  3 Sheets-Sheet 2
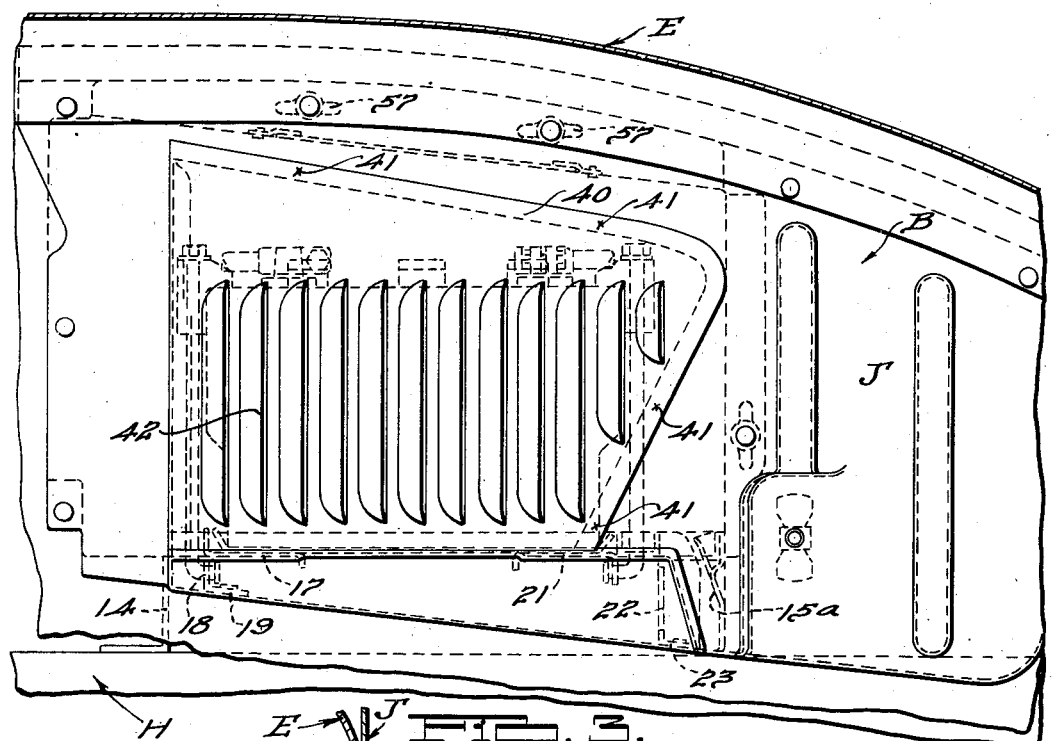
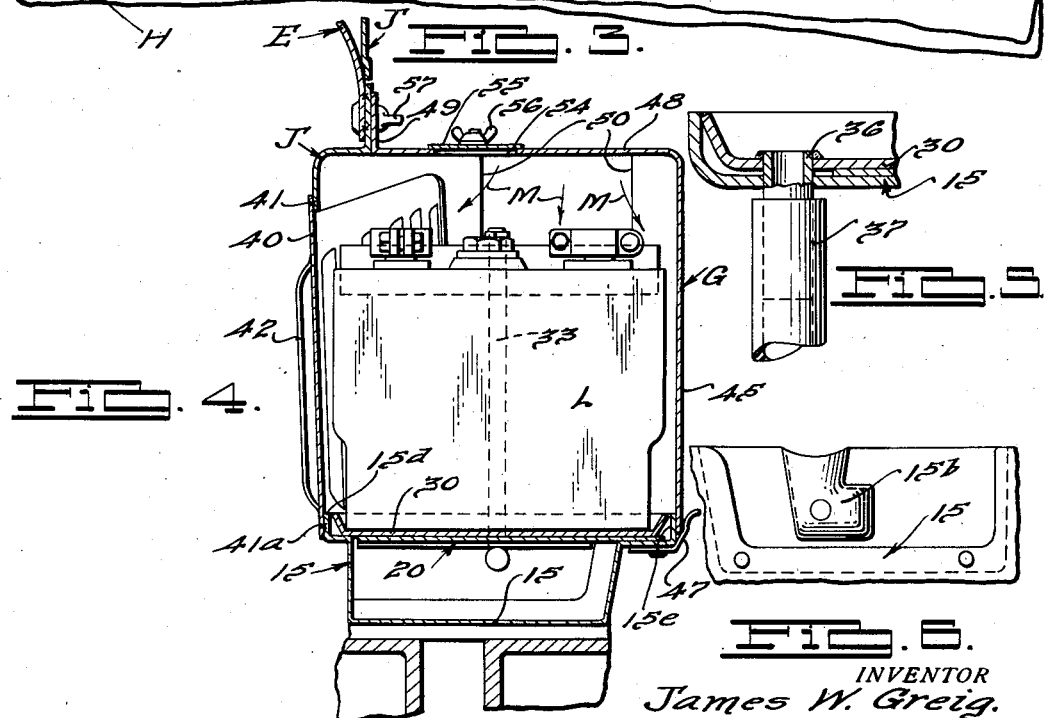
INVENTOR
James W. Greig.
BY
Dike, Calver & Gray
ATTORNEYS.

April 9, 1940.  J. W. GREIG  2,196,578
BATTERY HOUSING
Filed Dec. 24, 1937  3 Sheets-Sheet 3
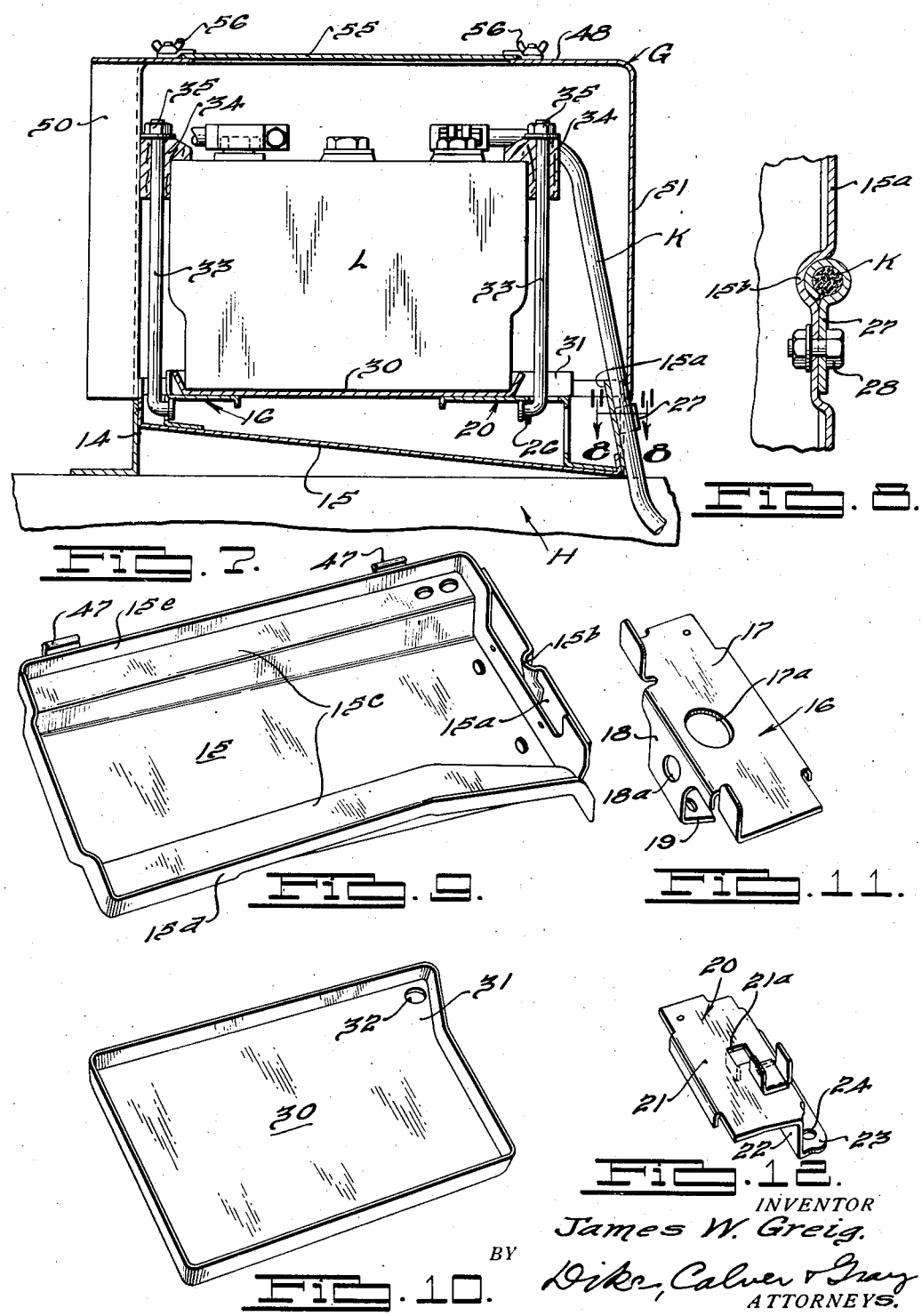

Patented Apr. 9, 1940

2,196,578

UNITED STATES PATENT OFFICE 2,196,578

BATTERY HOUSING

James W. Greig, Grosse Pointe Park, Mich., assignor to Hudson Motor Car Company, Detroit, Mich., a corporation of Michigan Application December 24, 1937, Serial No. 181,485

7 Claims. (Cl. 180—68.5)

This invention relates generally to a compartment such as a housing or casing for enclosing a storage battery for use in connection with motor vehicles and the like and has for an object the provision of improved means for supporting and enclosing the battery in a convenient location in the vehicle so that it will be readily accessible for servicing.

An object of the invention is to provide a housing for a battery adapted to be mounted or to extend within the engine compartment of a motor vehicle, the housing having an inlet for the flow of air into the housing and an outlet for the flow of air out of the housing, whereby effective ventilation of the housing and cooling of the battery will be assured during travel of the vehicle by producing a continuous flow of air through the housing and a circulation thereof around the battery.

A further object is to provide a battery housing mounted or extending within an enclosed compartment, such as the engine compartment, of a motor vehicle, said housing having air inlet and outlet means arranged to induce a flow of air through the housing, such air being taken in from outside the compartment and after circulating within the housing being discharged exteriorly of the compartment at a point or points to the rear of the intake.

Another object of the invention is to provide a battery housing for a motor vehicle comprising a casing having an intake for the flow of air into the casing and an outlet for the discharge of air therefrom, the outlet being provided with means effective to induce by suction a flow of air through the casing during the forward travel of the vehicle.

Another object of the invention is to provide means for supporting and enclosing a battery under the engine bonnet, or elsewhere and to provide novel means for protecting the battery from the heat generated by the engine and permitting the drainage of any accumulation of moisture or other liquid which might be detrimental to the efficiency and life of the battery.

The above and other objects of the invention will appear from the following description and appended claims when considered in connection with the accompanying drawings forming a part of this specification wherein like reference characters designate corresponding parts in the several views.

In said drawings:

Fig. 3 is a side elevation, partly in section, taken substantially along the line 3—3 of Fig. 2, looking in the direction of the arrows.

Fig. 4 is a vertical section taken substantially along the line 4—4 of Fig. 2, looking in the direction of the arrows.

Fig. 5 is a detail vertical sectional view, on an enlarged scale, taken substantially along the line 5—5 of Fig. 2, looking in the direction of the arrows.

Fig. 6 is a fragmentary detail vertical section, on an enlarged scale, taken substantially along the line 6—6 of Fig. 2, looking in the direction of the arrows.

Fig. 7 is a vertical longitudinal sectional view taken substantially along the line 7—7 of Fig. 2, looking in the direction of the arrows.

Fig. 8 is a detail horizontal sectional view, on an enlarged scale, taken substantially along the line 8—8 of Fig. 7, looking in the direction of the arrows.

Fig. 9 is a perspective view of the base or outer pan for the battery housing of the preceding figures.

Fig. 10 is a perspective view of the inner pan or battery supporting tray.

Fig. 11 is a perspective view of the front bracket for supporting the battery housing; and Fig. 12 is a similar view of the rear supporting bracket for the battery housing.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
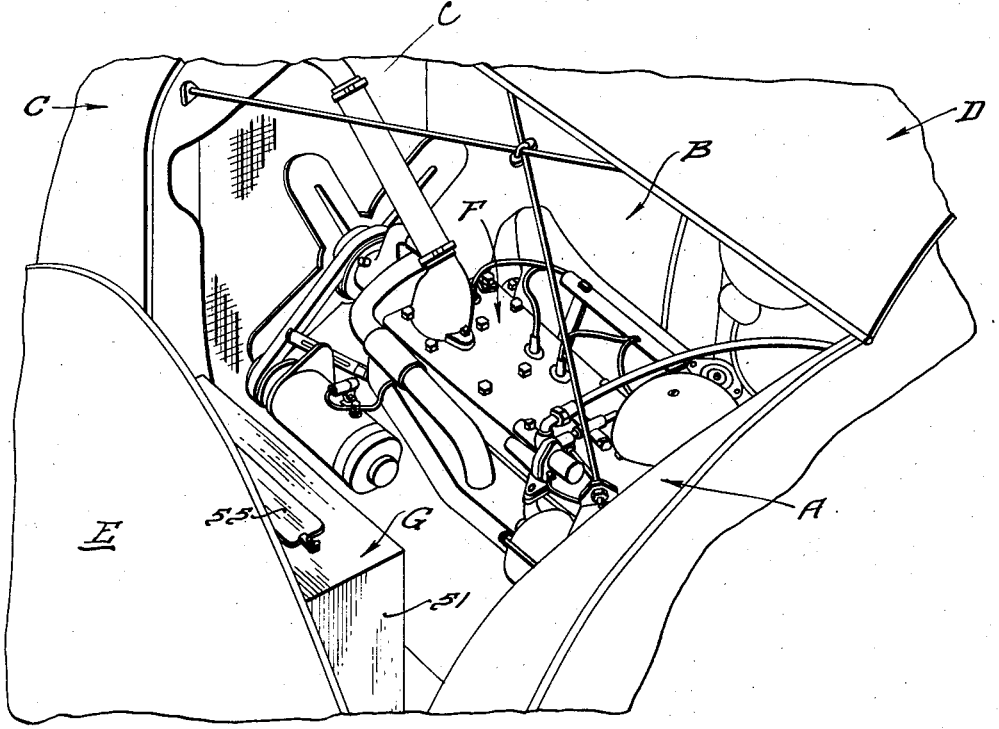
Fig. 1 is a fragmentary perspective view of the engine compartment of the motor vehicle with a portion of the bonnet in elevated position revealing one preferred location of the battery housing embodying the invention.
Figure 2:
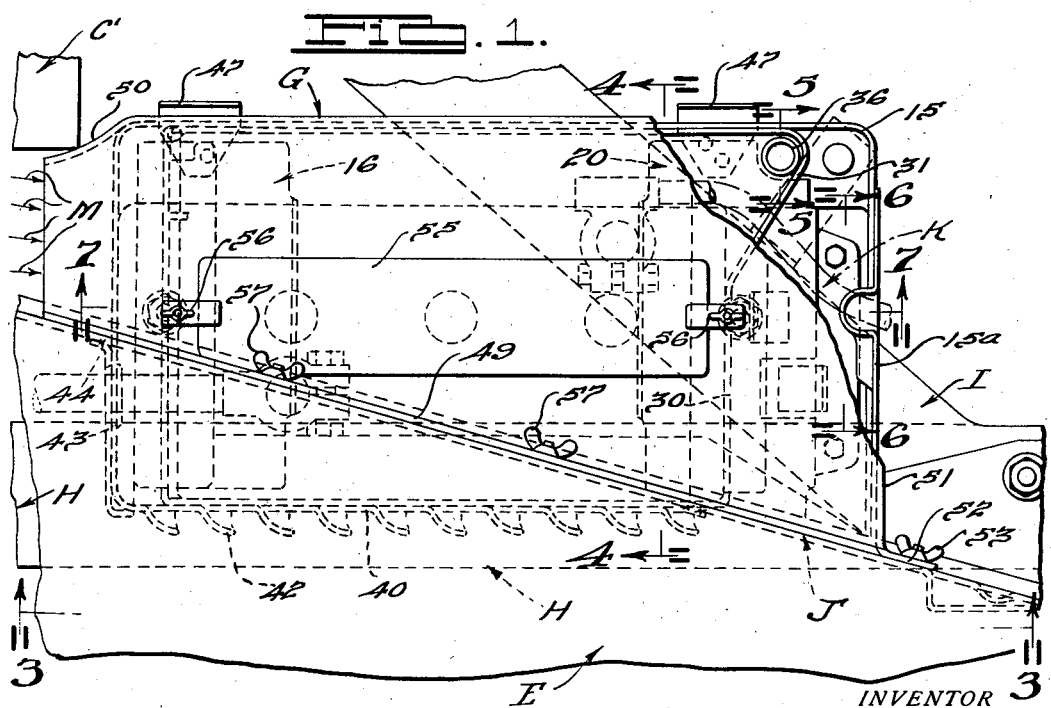
Fig. 2 is a top plan view showing the battery housing and some of the associated parts of the automobile.

Referring particularly to Figs. 1, 2 and 3, there is shown a portion of the front end of an automobile of the front engine type embodying the present invention and including a cowl A, engine compartment B, radiator shell C, radiator core C', bonnet or hood D, left fender E, engine F and one form of battery housing or casing G embodying the present invention. As seen in these figures, the battery housing G is sectional and is located partially within the engine compartment and has a portion which projects outwardly thereof into the space beneath the fender E. The chassis of the vehicle, as shown, includes a longitudinal frame member H and one member I of an X-frame upon which the engine F is mounted.

As best shown in Fig. 2, the left wall or section of the casing G extends or projects through an opening formed in a dust shield or partition plate J located beneath the fender, this for the reason that the shield J extends forwardly from the cowl at a converging angle toward the radiator so as to conform with the normal taper of the bonnet or hood from back to front. This construction, as will be seen, reduces the space within the engine compartment occupied by the battery housing and also facilitates location of the air exhausting or outlet means of the housing exteriorly of the engine compartment.

The battery enclosure or housing, in the present instance, comprises a bottom pan member shown as a whole at 15 which slopes downwardly from front to rear and, as shown, is welded at its front end to a transverse angle member or frame 14 and its rear end rests upon the frame member H, see particularly Fig. 7. The pan 15 carries adjacent its front end a bracket 16 having a flat transverse and rearwardly extending portion 17, a front depending flange 18 which is turned inwardly to provide a supporting base or flange 19 adapted to be secured to the bottom of the pan 15 in any suitable manner, as by means of bolts or welding. The parts 17 and 18 of the bracket are provided with bolt receiving holes 17a and 18a. The rear portion of the pan 15 supports a rear bracket member 20 having a flat portion 21, and a rear depending portion or flange 22 which is turned outwardly at 23 to provide a supporting base for the bracket. The base or flange 23 is provided with bolt holes 24 which are adapted to receive bolts or the like which pass through the holes 24 and through the bottom of the pan 15 to secure the bracket 20 and the rear end of the pan to the frame member H. The flat top portion 21 of the bracket is provided with an opening or hole 21a to receive a bolt and cooperates with a hole formed in a depending flange 26 to support the bolt which will be described hereinafter.

The rear or inner end of the pan 15 has an upright wall 15a having a depression or trough 15b formed therein to receive a portion of a battery cable K. The cable is held in place by means of a clip 27 bolted at 28 to the pan wall 15a, see particularly Figs. 7, 8 and 9.

The pan 15 is provided with opposed longitudinally extending ledges or supporting surfaces 15c which are adapted to receive and support a metal drip tray 30 having an offset corner 31 provided with a drain opening 32. As best seen in Figs. 4 and 7 the battery L rests upon the inner or upper tray 30 which in turn is supported at opposite ends by the brackets 16 and 20. The side edges of the tray rest upon and are supported by the ledges 15c.

The battery is clamped in place at its front and rear ends by L-bolts or rods 33 and clamp blocks 34. The lower end or head of the front bolt 33 projects through the bolt hole 18a formed in the bracket 16 and the lower end or head of the rear bolt 33 projects downwardly through the bolt hole 21a in the bracket 20 and forwardly through a similar hole in a vertical flange 26. By tightening the nuts 35 on the free ends of the bolts, the blocks 34 are caused to bind or grip the battery and hold it in place.

As seen in Fig. 5 a drain nipple 36 extends downwardly through the drain opening 32 and through a corresponding opening in the base pan 15. A hose 37 is attached to the lower end of the nipple and projects into the air stream beneath the engine compartment to carry off any moisture which might accumulate in the tray 30. Current is supplied to the battery in the usual manner by means of the cable K which, as mentioned above, is held by the clip 27 to the cable trough 15b.

The battery casing, as shown, is sectional and preferably comprises a substantially rectangular side wall or plate 40 which is welded at 41 along two sides thereof to the dust shield or plate J and at its bottom edge at 41a to the outer flange 15d of the pan, see Fig. 4. The plate 40 is provided with a series of vertical discharge outlets having rearwardly opening preferably vertically disposed louvres 42, see Figs. 2, 3 and 4. The plate 40 has a forward extension or wall 43 which extends inwardly toward the shield J and is preferably welded thereto at 44. The wall 43 may be integral with the plate 40 or formed as a separate piece welded to the plate and to the shield J. As best seen in Figs. 2 and 3, the plate or member 40 projects through an opening in the shield J and is disposed beneath the fender E, thus providing, with the front wall 43, a substantially triangular housing exterior to the engine compartment to receive a portion of the battery. The inturned portion or wall 43 provides an end closure for the battery compartment for approximately one-half the width of said compartment, see particularly Figs. 2 and 4.

The other walls or section of the battery housing or casing are, as shown, located on the inner or opposite side of the shield J within the engine compartment B. This section of the battery enclosure or casing comprises an inner upright wall 45 having its lower edge wedged or engaged between a longitudinal side flange 15e on the pan and a pair of spaced clips 47 carried by the pan. This casing portion or section has a top substantially horizontal wall 48 provided with a diagonally disposed upright flange 49. The forward edge of the wall 45 adjacent and to the rear of the radiator grille C is extended inwardly at an angle to provide a funnel-like member 50 having an intake opening. The intake member 50 as shown in Fig. 2, fits into a vertical space formed between one vertical end of the radiator core C' and the opposed upright side wall of the shield J. Thus the mouth of the intake 50 is exterior of the engine compartment and in position to receive air flowing through the front radiator grille openings and laterally past the radiator core during forward travel of the vehicle. Hence, approximately one-half of the front wall of the casing located behind the radiator grille is open to permit the ingress of air into the battery housing as indicated by the arrows M, see Fig. 2. The casing portions or section within the bonnet include a rear wall 51 flanged at 52 and contacting with the inner face of the shield J to be secured thereto by wing nuts 53. The top wall 48 has an elongated inspection opening 54 located above the cells of the battery. The opening is, as shown, closed by a removable plate or cover 55 held in place by wing nuts 56, or in any other suitable manner so that access can be had to the battery to service or inspect it without the necessity of removing the inner section or portion of the battery housing. The flange 49 of the top wall is secured to the shield J by wing nuts 57, see particularly Figs. 4 and 5. Thus the inner casing section is removably supported by means of the base clips 47 and the series of wing nuts 53 and 57.

If it is desirable to remove the battery from the car, the wing nuts 53 and 57 are released so that the entire inner section or portion of the enclosing housing can be lifted out to permit the battery to be lifted from its position upon the supporting pan 30.

When the vehicle is in motion, air enters through the funnel-like end of the battery enclosure 50 in the direction of the arrows M, passes over and around the battery L and escapes through the louvres 42 outside the engine compartment, thus tending to maintain a circulation of air within the battery compartment and preventing the accumulation of gases therein. It will be seen that the preferred arrangement of the louvres is such that they will project into the air stream and induce by suction a flow of air out of the battery housing, thereby facilitating the circulation and passage of fresh air through the housing.

The battery housing is, in effect, a two-part casing having a permanent outer section which, as shown, is welded to the outer face of the shield J and to the outer flange 15d of the pan, and an inner removable section comprising the walls 45, 48 and 51, held in place by the clips 47 and the wing nuts 53 and 57.

It will be seen, from the foregoing, that the battery L is enclosed by a sheet metal casing which is inexpensive to manufacture and which permits proper ventilation for the efficient operation of the battery and yet protects it from the weather and from excessive engine heat which might be detrimental to the life and proper functioning of the battery. In the event any moisture, such as rain, enters the battery compartment, this is drained off by the nipple and drain hose shown and described.

While I have shown my improved battery housing or enclosure associated with a motor vehicle of the front engine type, it will be understood that in one of its broader aspects, the invention also contemplates the use of a battery housing or casing in connection with vehicles of the rear engine type. Moreover, my improved battery housing or enclosure may be located at any desired point in a motor vehicle and my invention contemplates the utilization of air as an air stream created by the motion of the vehicle.

I claim:

1. A battery housing for a motor vehicle having an engine compartment, comprising a casing having a portion extending into said compartment and a portion located outside of said compartment, said first named portion having air intake means located within the compartment for directing air into the casing, and said second portion having air outlet means located outside the compartment for exhausting air from within the casing to a point or points outside of the compartment.

2. In combination with a motor vehicle engine compartment, dust shield and fender, of a storage battery, and a housing for enclosing said battery, said housing comprising a portion arranged externally of said dust shield and beneath the fender and a second portion located within the engine compartment and removably attached to said dust shield, said second portion having an opening within the air stream of the vehicle to permit the ingress of air to the battery housing, and said external portion having louvres to permit the egress of air from within the battery housing.

3. A battery housing for a motor vehicle having a longitudinal frame member and an engine compartment, comprising a casing having a portion located within said compartment and a portion located outside of said compartment, said first named portion having air intake means for directing air into the casing, said second portion having air outlet means located in an upright wall thereof for exhausting air from within the casing to a point or points outside of the compartment, said casing having an inclined bottom portion mounted on the frame member and horizontal spaced ledge portions, and a drip tray mounted upon said ledge portions for supporting a battery within the casing, said tray having a drain opening formed therein.

4. A battery housing for a motor vehicle having a longitudinal frame member and an engine compartment, comprising a casing having a portion located within said compartment and a portion located outside of said compartment, said first named portion having air intake means for directing air into the casing, said second portion having air outlet means located in an upright wall thereof for exhausting air from within the casing to a point or points outside of the compartment, said casing having an inclined bottom portion mounted on the frame member and horizontal spaced ledge portions, a drip tray mounted upon said ledge portions for supporting a battery within the casing, said tray and said bottom portion having registering openings formed therein, a nipple extending through said openings, and a drain hose attached to said nipple and extending into the air stream beneath the engine compartment and adapted to carry off moisture from said tray.

5. A battery housing for a motor vehicle having an engine compartment, comprising a casing having a bottom pan, a portion extending into said compartment and a portion located outside of said compartment, said first named portion having air intake means for directing air into the casing, and said second portion having air outlet means for exhausting air from within the casing to a point or points outside of the compartments, a separate drip tray supported above said bottom pan, the top wall of said casing within the engine compartment having an inspection opening formed therein, and a removable cover for closing said opening.

6. A battery housing for a motor vehicle having an engine compartment, comprising a casing having a bottom, a portion extending into said compartment and a portion located outside of said compartment, said first named portion having air intake means for directing air into the casing, said second portion having air outlet means for exhausting air from within the casing to a point or points outside of the compartment, and a drip tray located within and mounted upon the casing bottom for supporting a battery, said drip tray having a drain opening formed therein.

7. In combination with a motor vehicle engine compartment, dust shield and fender, of a storage battery, and a housing for enclosing said battery, said housing comprising a portion arranged externally of said dust shield and beneath the fender and a second portion located within the engine compartment and removably attached to said dust shield, said second portion having an opening within the air stream of the vehicle to permit the ingress of air to the battery housing, said external portion having louvres to permit the egress of air from within the battery housing, said second housing portion within the engine compartment also having an opening in its top, and a movable cover for closing said top opening.

JAMES W. GREIG.